UNITED STATES PATENT OFFICE 1,989,568

CHROMIFEROUS DYESTUFF AND PROCESS OF MAKING SAME

Fritz Straub, Basel, and Hermann Schneider, Riehen, near Basel, Switzerland, assignors to the firm of Society of Chemical Industry in Basle, Basel, Switzerland No Drawing. Application March 29, 1934, Serial No. 718,081. In Switzerland April 3, 1933

10 Claims. (Cl. 260—12)

It has been found that chromiferous dyestuffs are obtained from azo-dyestuffs of the general formula

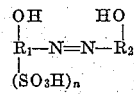

wherein $R_1$ and $R_2$ represent naphthalene radicals and $n$ means the number 1—2, wherein further the two hydroxyl-groups stand in ortho-position to the azo-bridge, and the hydroxyl-group of the naphthalene radical $R_2$ stands in the 2-position of the naphthalene radical, by treating these azo-dyestuffs with such complex compounds which are produced by the action of organic compounds containing at least one hydroxyl-group on alkaline suspensions of chromium hydroxide.

For making the parent azo-dyestuffs there may be used, for example, diazotized 1-amino-2-hydroxynaphthalene-4-sulfonic acid, diazotized 2-amino-1-hydroxynaphthalene-4-sulfonic acid diazotized 1-amino-2-hydroxynaphthalene-4,8-disulfonic acid, diazotized 1-amino-2-hydroxynaphthalene-4,6-disulfonic acid, diazotized chloro- or bromo-1-amino-2-hydroxynaphthalene-4-sulfonic acid, or nitrated 1-diazo-2-hydroxynaphthalene-4-sulfonic acid as the one component and 2-hydroxynaphthalene or a substitution product thereof, such as chloro-, bromo-, methyl-, or alkoxy-2-hydroxynaphthalene as the other component.

The treatment of the azo-dyestuff with such complex compounds which are produced by the action of organic compounds containing at least one hydroxyl-group on alkaline suspensions of chromium hydroxide, as for instance a polyvalent alcohol or phenol (for example glycerin, glycol, gallic acid)., a tanning material such as, for example, tannin, a sugar, a cellulose derivative (for example sulfite waste liquor) or a lignin, may consist for instance in heating together in an open vessel or under pressure a chromium salt, an excess of alkali (for instance caustic soda solution or caustic potash solution), the organic compound containing at least one hydroxyl-group and the azo-dyestuff, or in heating the azo-dyestuffs with such complex compounds which are produced by the action of organic compounds containing at least one hydroxyl-group on alkaline suspensions of chromium hydroxide, the operations being conducted in the presence or absence of a suitable further substance, such as a soluble inorganic or organic salt or the like.

The proportion of the azo-dyestuff to the alkaline chroming agent, as well as the proportion of the alkaline chroming agent to the organic compound containing at least one hydroxyl-group may vary within wide limits. Moreover, the duration of the treatment as well as the concentration of the alkali may be varied in many ways.

The chromiferous dyestuffs obtainable by this process dye animal fibres, such as for example, wool and silk, navy-blue to black tints, both in a sulfuric acid bath and, particularly advantageously, in the manner described in the U. S. Patent No. 1,903,884 or when dyeing in dye-baths containing an aromatic acid besides an inorganic acid. The invention is particularly suitable for making very valuable chromiferous dyestuffs dyeing navy blue from an ortho-hydroxy-amino-naphthalene sulfonic acid which contains no nitro-group and a 2-hydroxynaphthalene. These chromiferous dyestuffs, as compared with those hitherto known and those of this group which dye animal fibres in similar tints, are level in dyeing deep tints and are fast in every respect, particularly to rubbing. The invention provides a method of converting the very cheap blue dyestuffs known as fast chrome cyanines into cheap and fast chromium compounds dyeing navy blue, which was not possible by the chroming methods hitherto known and applied to this group of dyestuffs.

The following examples illustrate the invention the parts being by weight:—

Example 1

Into a glycerine chromite solution made from 25.6 parts of $Cr_2O_3$ in the form of a chromium hydroxide paste of 11.5 per cent. strength, 120 parts of caustic alkali of 90 per cent. strength and 43 parts of glycerine of 90 per cent. strength, and cooled to 40–50° C., there are stirred 208 parts of the azo-dyestuff of the formula

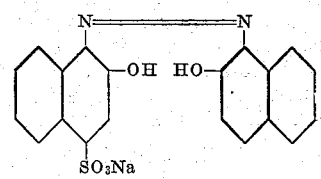

from diazotized 1-amino-2-hydroxynapthalene-4-sulfonic acid and mono-sodium 2-hydroxynaphthalene, in the form of a paste of about 30 per cent. strength. The mixture is first heated gradually, while stirring, to 75–80° C., then kept at this temperature for 3 hours and then heated for 6–8 hours at 80–85° C. After dilution with water to 3000 parts, the liquor is neutralized with hydrochloric acid of 10 per cent. strength, while stirring well, then made feebly acid to litmus with formic acid and, after filtration from a small quantity of impurities, evaporated to dryness in a vacuum.

The chromed dyestuff obtained dyes wool in a bath acid with organic acid and sulfuric acid navy blue tints of excellent fastness and of good color by artificial light.

Example 2

In 135 parts of caustic soda solution of 30 per cent. strength to which 6 parts of sugar have been added, there are dissolved at 80-90° C. 54.3 parts of a chromium hydroxide paste of 14 per cent. strength, corresponding with 7.6 parts of $Cr_2O_3$. After cooling to 50° C. there are introduced a paste of about 30 per cent. strength of 41.6 parts of the azo-dyestuff from diazotized 1-amino-2-hydroxynaphthalene-4-sulfonic acid and 2-hydroxynaphthalene (mono-sodium salt) and the mixture is stirred for 2 hours at 75-80° C. and then heated for 8 hours at 85-90° C. The blue mixture thus obtained is then diluted with cold water to make about 500 parts, carefully neutralized with hydrochloric acid of 10 per cent. strength, acidified with 5 parts of formic acid, filtered from excess of chromium and the chromiferous dyestuff salted out.

It dissolves in water very freely to a blackish-blue solution. It dyes wool in a bath acid with organic acid and sulfuric acid navy blue tints of very good fastness.

Example 3

675 parts of a paste of the azo-dyestuff from diazotized 1-amino-2-hydroxynaphthalene-4-sulfonic acid and 2-hydroxynaphthalene containing 138.6 parts of the dyestuff, are stirred with 50 parts of caustic soda solution of 30 per cent. strength. In the meantime there is prepared a chromite solution in the following manner:—

Into a mixture of 42 parts of potassium hydroxide of 90 per cent. strength and 90 parts of caustic soda solution of 30 per cent. strength there is stirred a chromium hydroxide paste of 12 per cent. strength containing 19 parts of $Cr_2O_3$ and the whole is heated to 60-70° C. to form a solution. There are then added 35 parts of sulfite cellulose liquor and the mass is poured, while stirring, into the dyestuff solution. After addition of 46 parts of crystallized sodium acetate this mixture is heated, while stirring, first for about 3 hours at 75-80° C. and then for 3 hours at 90-100° C. The black-blue solution produced is then diluted with an equal volume of water, neutralized with mineral acid of 5-10 per cent. strength and, after filtration from a small quantity of impurities, evaporated to dryness in a vacuum. The new chromium compound is a blue-grey powder, soluble in water to a blue solution having red dichroism; it is also soluble to a blue solution in sodium carbonate solution of 10 per cent. strength and sparingly soluble in caustic soda solution of 10 per cent. strength.

Example 4

Into a freshly prepared potassium chromite solution obtained by stirring a mixture of 70 parts of a chromium hydroxide paste of 8 per cent. strength, corresponding with 5.6 parts $Cr_2O_3$, 13 parts of gallic acid and 48 parts of caustic potash of 90 per cent. strength there are introduced 41 parts of the azo-dyestuff from diazotized 1-amino-2-hydroxynaphthalene-4-sulfonic acid and 2-hydroxynaphthalene in the form of a paste of 20 per cent. strength. The mixture is heated, while stirring, for 6 hours at 80-90° C. and then heated for a further 2 hours at 90-100° C. It is then diluted with cold water to 500 parts by volume, neutralized with strongly diluted hydrochloric acid and evaporated to dryness in a vacuum.. The new chromiferous dyestuff is a violet-black powder, soluble in water to a violet blue solution having strongly red dichroism. In sodium carbonate solution of 10 per cent. strength and caustic soda solution of 10 per cent. strength it dissolves to a blue-violet solution in each case and in concentrated sulfuric acid to a blackish-blue solution. It dyes wool in a bath acid with an organic acid and sulfuric acid navy blue tints of very good properties of fastness.

Example 5

A potassium chromite solution made by stirring 44 parts of caustic potash of 90 per cent. strength with 67 parts of a chromium hydroxide paste of 8 per cent. strength, corresponding with 5.4 parts of $Cr_2O_3$, is mixed with 20 parts of sulfite cellulose liquor and there are introduced, while stirring, 41.6 parts of the azo-dyestuff from diazotized 1-amino-2-hydroxynaphthalene-4-sulfonic acid and 2-hydroxynaphthalene in the form of a paste of 20 per cent. strength; the mixture is heated for 6 hours at 80-90° C. and then for 2 hours at 90-100° C. It is then diluted with 300 parts of water, filtered from a small quantity of insoluble matter, neutralized with strongly diluted hydrochloric acid and mixed with common salt to salt out the chromiferous dyestuff. The latter when dry is a violet-black powder, soluble in water to a blue, strongly dichroic solution. In sodium carbonate solution of 10 per cent. strength, caustic soda solution of 10 per cent. strength and concentrated sulfuric acid it dissolves to a blue solution in each case. It dyes wool in a bath acid with organic acid and sulfuric acid navy blue tints of excellent properties of fastness.

Example 6

11.2 parts of the azo-dyestuff from the chlorinated diazo-compound of 1-amino-2-hydroxynaphthalene-4-sulfonic acid and 2-hydroxynaphthalene are introduced into a potassium chromite solution which has been freshly prepared from 18 parts of a chromium hydroxide paste of 8 per cent. strength, corresponding with 1.44 parts of $Cr_2O_3$, 11 parts of caustic potash of 90 per cent. strength and 3 parts of sugar. After heating the mass, while stirring, first for 6 hours at 80-90° C. and then for 2 hours at 90-100° C. it is diluted to 100 parts with cold water and the new chromiferous dyestuff is precipitated by neutralizing with strongly diluted hydrochloric acid. When dry it is a grey-violet powder, soluble in water to a blue solution which is strongly red dichroic. Sodium carbonate solution of 10 per cent. strength and caustic soda solution of 10 per cent. strength dissolve it to violet solutions and concentrated sulfuric acid to a blue solution having red dichroism. It dyes wool in a bath acid with organic acid and sulfuric acid excellent fast, navy blue tints.

Example 7

A chromite solution is prepared from 16.5 parts of a chromium hydroxide paste of 8 per cent strength, corresponding with 1.33 parts of $Cr_2O_3$, 27 parts of caustic soda solution of 30 per cent. strength and 2 parts of glycerine; into this chromite solution there are introduced 12.4 parts of the azo-dyestuff of the formula

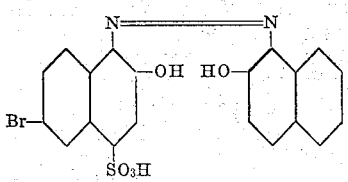

from the brominated diazo-compound of 1-amino-2-hydroxynaphthalene-4-sulfonic acid and 2-hydroxynaphthalene. The mass is diluted with 20 parts of water, heated, while stirring, for 6 hours at 80–90° C., and then for 2 hours at 90–100° C. The new chromiferous dyestuff is precipitated by neutralizing the mass with strongly diluted sulfuric acid. When dry it is a grey-black powder, which dissolves in water to a blue solution. In sodium carbonate solution of 10 per cent. strength it is insoluble, while in caustic soda solution of 10 per cent. strength it dissolves in traces to a violet solution. In concentrated sulfuric acid it dissolves to a blue solution having red dichroism. It dyes wool in a bath acid with organic acid and sulfuric acid fast navy blue tints.

Example 8

Into a potassium chromite solution containing 104 parts of a chromium hydroxide paste of 8 per cent. strength, corresponding with 8.32 parts of $Cr_2O_3$, 60 parts of caustic potash of 90 per cent. strength and 10 parts of sugar there are introduced 52 parts of the azo-dyestuff of the formula

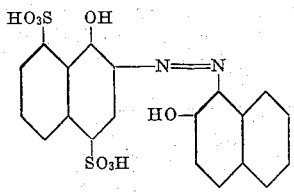

from diazotized 2-amino-1-hydroxynaphthalene-4:8-disulfonic acid and 2-hydroxynaphthalene. The mixture is diluted with 30 parts of water and heated, while stirring for 6 hours at 80–90° C. and for a further 2 hours at 90–100° C. It is diluted with 200 parts of cold water, neutralized with strongly diluted mineral acid and evaporated to dryness in a vacuum. There is obtained a chromiferous dyestuff in the form of a violet black powder which dissolves in water freely to a blue solution having red dichroism. Sodium carbonate solution of 10 per cent. strength dissolves it to a reddish-blue solution with strong red dichroism, while the solution in caustic soda solution of 10 per cent. is violet. Concentrated sulfuric acid dissolves the dyestuff to a blackish blue solution. The dyestuff dyes wool in a bath acid with organic acid and sulfuric acid navy blue tints of excellent properties of fastness.

Example 9

20.8 parts of the azo-dyestuff of the formula

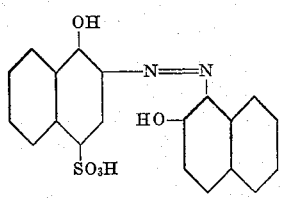

from diazotized 2-amino-1-hydroxynaphthalene-4-sulfonic acid and 2-hydroxynaphthalene are introduced into a freshly prepared sodium chromite solution which has been obtained by mixing and boiling together 42.5 parts of a chromium hydroxide paste of 8 per cent. strength, corresponding with 3.42 parts of $Cr_2O_3$, 80 parts of caustic soda solution of 30 per cent. strength and 7 parts of glycerine of 90 per cent. strength. The mixture is stirred and heated for 6 hours at 80–90° C. and then for 2 hours at 90–100° C.; it is then diluted with cold water to 300 parts and neutralized with strongly diluted sulfuric acid. The chromiferous dyestuff is now salted out. When dry it is a grey-violet powder which dissolves in water and sodium carbonate solution of 10 per cent. strength to a red-violet, strongly red dichroic solution; in caustic soda solution of 10 per cent. strength it dissolves to a violet solution and in concentrated sulfuric acid to a blackish blue-green solution. It dyes wool in a bath acid with organic acid and sulfuric acid excellently fast navy blue tints with a reddish tone.

Example 10

46.1 parts of the azo-dyestuff of the formula

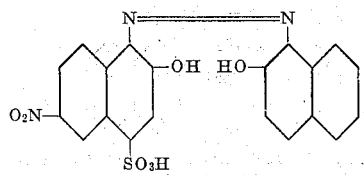

from the nitrated diazo-compound of 1-amino-2-hydroxynaphthalene-4-sulfonic acid and 2-hydroxynaphthalene are stirred into a sodium chromite solution, which has been freshly made from 70 parts of a chromium hydroxide paste of 8 per cent. strength, corresponding with 5.7 parts of $Cr_2O_3$, 110 parts of caustic soda solution of 30 per cent. and 20 parts of sugar. The mixture is diluted with 120 parts of water and stirred and heated for 6 hours at 75–80° C. and then for 3 hours at 80–90° C. The mass is introduced into 1500 parts of hot water, made strongly acid to litmus paper with slightly diluted formic acid, filtered from insoluble matter and the filtrate evaporated to dryness. The chromiferous dyestuff is a black powder, soluble in water to a brown violet-black solution. In sodium carbonate solution of 10 per cent. strength and caustic soda solution of 10 per cent. strength it is dissolved only in traces to solutions of the same color, whereas in concentrated sulfuric acid it dissolves to a blackish-blue solution. The dyestuff dyes wool in a bath acid with organic acid and sulfuric acid black shades of good properties of fastness.

What we claim is:—

1. Process for the manufacture of chromiferous dyestuffs from azo-dyestuffs of the general formula

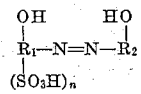

wherein $R_1$ and $R_2$ represent naphthalene radicals and $n$ means the number 1—2, wherein further the two hydroxyl-groups stand in ortho-position to the azo-bridge, and the hydroxyl-group of the naphthalene radical $R_2$ stands in the 2-position of the naphthalene radical, consisting in reacting these azo-dyestuffs with such complex compounds which are produced by the action of organic compounds containing at least one alcoholic hydroxyl-group on alkaline suspensions of chromium hydroxide.

2. Process for the manufacture of chromiferous dyestuffs from azo-dyestuffs of the general formula

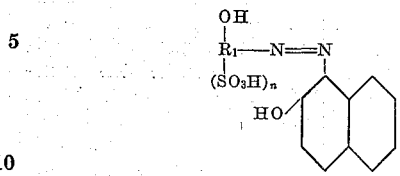

wherein $R_1$ represents a naphthalene radical and $n$ means the number 1—2, wherein further the hydroxyl-group of the radical $R_1$ stands in ortho position to the azo-bridge, consisting in reacting these azo-dyestuffs with such complex compounds which are produced by the action of organic compounds containing at least one alcoholic hydroxyl-group on alkaline suspensions of chromium hydroxide.

3. Process for the manufacture of chromiferous dyestuffs from azo-dyestuffs of the general formula

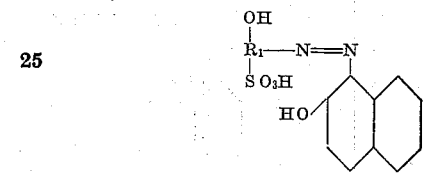

wherein $R_1$ represents a naphthalene radical and the hydroxyl-group of the naphthalene radical $R_1$ stands in ortho-position to the azo-bridge, consisting in reacting these azo-dyestuffs with such complex compounds which are produced by the action of organic compounds containing at least one alcoholic hydroxyl-group on alkaline suspensions of chromium hydroxide.

4. Process for the manufacture of chromiferous dyestuffs from the azo-dyestuff of the formula

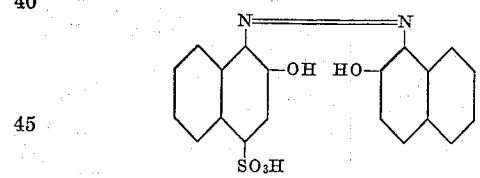

consisting in reacting this azo-dyestuff with such complex compounds which are produced by the action of organic compounds containing at least one alcoholic hydroxyl-group on alkaline suspensions of chromium hydroxide.

5. Process for the manufacture of a chromiferous dyestuff from the azo-dyestuff of the formula

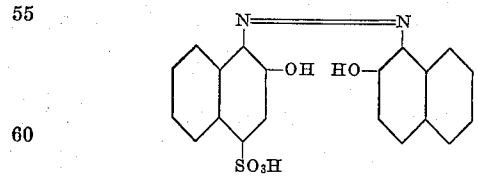

consisting in reacting this azo-dyestuff with such complex compounds which are produced by the action of glycerine on suspensions of chromium hydroxide.

6. Chromiferous dyestuffs, obtained from the azo-dyestuffs of the general formula

wherein $R_1$ and $R_2$ represent naphthalene radicals and $n$ means the number 1—2, wherein further the two hydroxyl-groups stand in ortho- position to the azo-bridge, and the hydroxyl-group of the naphthalene radical $R_2$ stands in the 2-position of the naphthalene radical, by reacting these azo-dyestuffs with such complex compounds which are produced by the action of organic compounds containing at least one alcoholic hydroxyl-group on alkaline suspensions of chromium hydroxide, which products represent grey and black powders, dissolving in water to violet, blue and black solutions, and dyeing wool blue and black tints of very good fastness properties.

7. Chromiferous dyestuffs, obtained from the azo-dyestuffs of the general formula

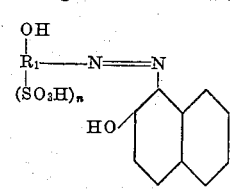

wherein $R_1$ represents a naphthalene radical and $n$ means the number 1—2, wherein further the hydroxyl-group of the radical $R_1$ stands in ortho-position to the azo-bridge, by reacting these azo-dyestuffs with such complex compounds which are produced by the action of organic compounds containing at least one alcoholic hydroxyl-group on alkaline suspensions of chromium hydroxide, which products represent grey and black powders, dissolving in water to violet, blue and black solutions, and dyeing wool blue and black tints of very good fastness properties.

8. Chromiferous dyestuffs, obtained from the azo-dyestuffs of the general formula

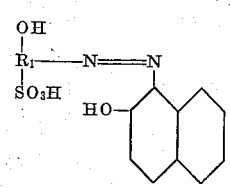

wherein $R_1$ represents a naphthalene radical and the hydroxyl-group of the napthalene radical $R_1$ stands in ortho-position to the azo-bridge, by reacting these azo-dyestuffs with such complex compounds which are produced by the action of organic compounds containing at least one alcoholic hydroxyl-group on alkaline suspensions of chromium hydroxide, which products represent grey and black powders, dissolving in water to violet, blue and black solutions, and dyeing wool blue and black tints of very good fastness properties.

9. Chromiferous dyestuffs, obtained from the azo-dyestuff of the formula

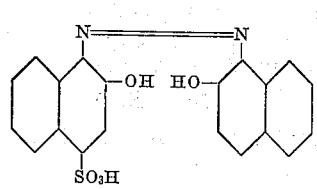

by reacting this azo-dyestuff with such complex compounds which are produced by the action of organic compounds containing at least one alcoholic hydroxyl-group on alkaline suspensions of chromium hydroxide, which products represent grey and black powders, dissolving in water to violet and blue solutions, and dyeing wool navy blue tints of very good fastness properties and excellent appearance in the artificial light.

10. The chromiferous dyestuff, obtained from the azo-dyestuff of the formula

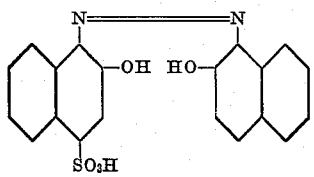

by reacting this azo-dyestuff with such complex compounds which are produced by the action of glycerine on suspensions of chromium hydroxide, which product represents a grey to black powder dissolving in water to a violet to blue solution, and dyeing wool navy blue tints of very good fastness properties and excellent appearance in the artificial light.

FRITZ STRAUB.
HERMANN SCHNEIDER.